2,712,175
PROCESS OF BRAZING WITH COPPER-BASE ALLOY

Louis E. Stark, Grand Island, N. Y., assignor to Union Carbide and Carbon Corporation, a corporation of New York No Drawing. Application April 21, 1952, Serial No. 283,515

2 Claims. (Cl. 29—504)

This invention relates to a welding rod composed of a copper-base alloy and has for its principal object a rod which is substantially nonfuming in use, produces a sound, strong deposit of weld metal and which is particularly satisfactory for deposition by inert-gas metal-arc welding and brazing methods.

The invention comprises a welding rod composed of a copper-manganese alloy. More specifically, the welding rod of the invention contains 25% to 35% manganese; up to 10% aluminum; up to 2% silicon; remainder copper and incidental impurities. A preferred composition is 28% to 30% manganese; 3% to 5% aluminum; 0.1% to 0.25% silicon; remainder copper. In accordance with the invention, rods of such composition are employed in an improved process of brazing by melting in an inert shielding atmosphere.

In testing welding rods embodying the invention, welds were made in steel plate of different thicknesses. In one series of tests, for instance, pieces of steel plate ⅜ inch thick were joined by inert-gas metal-arc welding using welding rods of the invention. The welds were made in three of four passes at welding currents of 190 to 200 amperes, alternating current, and using argon as the shielding gas at a flow of 20 to 25 cubic feet per hour. One inch wide transverse tensile coupons were prepared and tested from welds so made. Welds made in ½ inch mild steel plate were used for the preparation of 0.375 inch diameter all weld-metal tensile specimens. Hardness surveys were made of the weld metal with a Vickers hardness tester utilizing a diamond pyramid indenter at a 5 kilogram load.

The following table sets forth typical results of tests made of welds made as just described. In the table "T. S." means ultimate tensile strength in pounds per square inch, "Y. P." means yield point in pounds per square inch, "Percent El." means the percentage of elongation between 1½ inch gage marks on failure, and "D. P. H." means average diamond pyramid hardness. In the reported tests of the welded coupons, referred to in the table as "Weld," all failures occurred in the plate. The values reported in that column are the average of four tests.

It will be seen from the data in the table that the welding or brazing rod of the invention produces strong, ductile welds. During use no noxious fumes are produced, and the deposited metal is sound and clean. The molten weld metal has a very good "tinning" action on the base metal, and little dilution occurs. The melting point of the welding and brazing rod is in the range 850° C. to 900° C.

The rod of the invention is simply manufactured by conventional practice. In melting the alloy it is advisable to protect it from oxidation by covering the melt, for example with granular carbon or by melting it in an inert atmosphere such as argon.

Although for purposes of illustration this description refers only to the use of the welding rod for welding mild steel, the use of the rod is not so limited. For example, very good results have been obtained in using it for welding or brazing stainless steel. It has been used successfully in railroad field tests for building up parts such as the collars of traction motor bearings and can be used for surfacing and repairing many alloys such as alloys of iron or copper.

What is claimed is:

1. In the process of brazing by depositing a copper base alloy on a metallic article, the step which consists in melting in an inert shielding atmosphere an alloy containing 25% to 35% manganese; 1.0% to 10% aluminum; 0.1% to 2% silicon; the remainder copper and incidental impurities.

2. In the process of brazing by depositing a copper base alloy on a metallic article, the step which consists in melting in an inert shielding atmosphere, an alloy containing 28% to 30% of manganese; 3% to 5% aluminum; 0.1% to 0.25% silicon; the remainder copper and incidental impurities.

References Cited in the file of this patent

UNITED STATES PATENTS

| | | |
|---|---|---|
| 102,324 | Savage | Apr. 26, 1870 |
| 306,229 | Dick | Oct. 17, 1884 |
| 1,671,408 | Corson | May 29, 1928 |
| 1,840,921 | Spence | Jan. 12, 1932 |

FOREIGN PATENTS

| | | |
|---|---|---|
| 431,584 | Great Britain | July 11, 1935 |
| 526,033 | Great Britain | Sept. 10, 1940 |

| Percent Composition—Rest Cu | | | Physical Properties | | | | |
|---|---|---|---|---|---|---|---|
| | | | | All Weld Metal | | | |
| Mn | Al | Si | Weld, T. S. | Y. P. | T. S. | Percent El. | D. P. H. |
| 30 | Nil | Nil | 60,150 | 39,100 | 62,700 | 11.3 | 185 |
| 30 | Nil | Nil | 59,570 | 36,400 | 70,800 | 25.3 | 186 |
| 29 | Nil | Nil | 59,900 | 37,300 | 68,200 | 20.3 | 190 |
| 29 | 0.5 | 0.2 | 59,800 | 46,600 | 73,100 | 13.3 | 198 |
| 30 | 1 | Nil | 61,400 | 32,200 | 51,600 | 5.3 | 187 |
| 29 | 4 | 0.2 | 60,500 | 48,400 | 80,500 | 20.0 | 193 |
| 29 | 7 | 0.2 | 57,700 | ---- | 64,600 | ------ | 215 |